Feb. 27, 1968 E. A. JOHNSON 3,370,320
HIDE GUIDES FOR HIDE PULLERS
Filed Nov. 23, 1965 2 Sheets-Sheet 1

INVENTOR
EDWARD DAVID JOHNSON

Feb. 27, 1968 E. A. JOHNSON 3,370,320
HIDE GUIDES FOR HIDE PULLERS
Filed Nov. 23, 1965 2 Sheets-Sheet 2

INVENTOR
EDWARD REGID JOHNSON
BY
ATTYS

United States Patent Office 3,370,320
Patented Feb. 27, 1968

3,370,320
HIDE GUIDES FOR HIDE PULLERS
Edward Arvid Johnson, 506 Kildare Ave. E.,
Transcona, Manitoba, Canada
Filed Nov. 23, 1965, Ser. No. 510,143
Claims priority, application Canada, Dec. 15, 1964,
918,766
24 Claims. (Cl. 17—21)

ABSTRACT OF THE DISCLOSURE

This device consists of a pair of hide guides used in conjunction with a hide puller wherein the hide is held close together as it is stripped from the carcass with the sides folding in upon one another so that any dirt or debris is collected within the trough formed by the hide. Additionally further guide means extend from the hide guides towards the upper end thereof which may be adjusted as to the distance therebetween.

My invention relates to new and useful improvements in hide pullers, particularly hide pullers of the endless conveyor type, an example of which is shown in my U.S. Patent No. 3,129,454, dated Apr. 21, 1965.

With this type of hide puller, the hide is pulled from the carcass of the cattle which is suspended by the hind legs thereof from an overhead rail, the front legs being secured against movement of the carcass during the pulling process.

As the hide is stripped from the carcass, the hide is flexed thus causing displacement of dust, dirt and hair from the outer surface of the hide, said dust, dirt and hair having the tendency to fall from the hide so that it may be deposited upon the stripped carcass.

It will be appreciated that this is unsatisfactory and unhygienic and one of the objects of the present device is to overcome this to that extent.

I have found that by providing a pair of spaced and parallel guide rails situated upon each side of the front run of the conveyor, that the hide is forced into a relatively narrow V-shaped trough thus trapping the dirt and debris and preventing same from being displaced from the hide.

The principal object and essence of my invention is therefore to provide a pair of side guide rails which maintain the stripped hide in a relative V-shaped folded condition as it is being stripped from the carcass thus trapping dirt and debris within the hide and preventing same from being deposited upon the stripped carcass.

Another advantage of the present invention is to provide a device of the character herewithin described which changes the angle of pull of the hide from the carcass and facilitates the separation of the hide from the carcass.

A still further object of the invention is to provide a device of the character herewithin described which includes an over-spanning device at the upper end of the guide rails which rolls the hide inwardly upon itself during the last part of the pulling process thus assisting in the trapping of debris within the hide.

Still another object of the invention is to provide a device of the character herewithin described which is easily attached to the existing hide pullers of the vertical endless conveyor type.

A still further object of the invention is to provide a device of the character herewithin described in which the overspanning member is movable vertically against spring action, within limits, thus providing a certain amount of flexibility at the upper end, and enabling the device to be used efficiently upon cattle of different sizes.

Yet another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
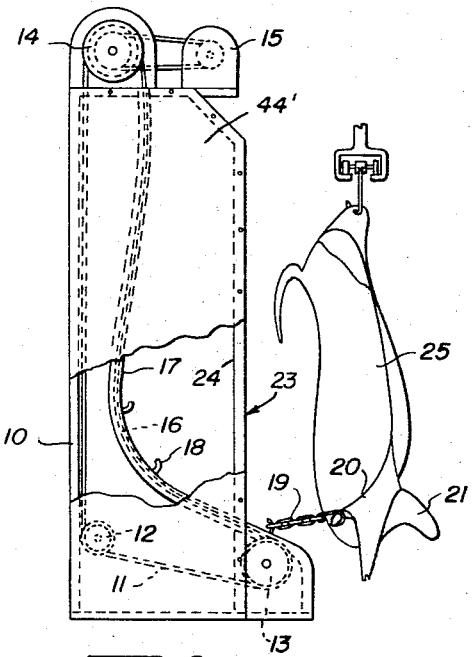
FIGURE 1 is a side elevation of a hide puller with my device installed thereon.
Figure 2:
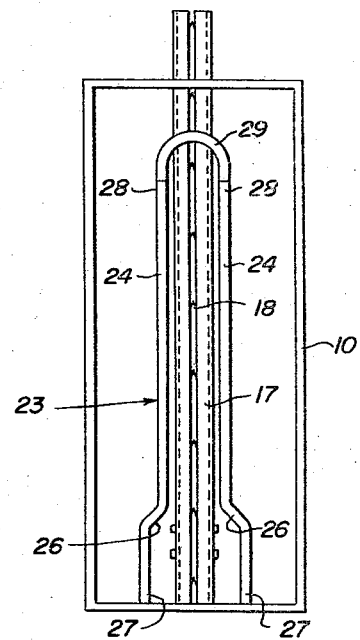
FIGURE 2 is a front elevation of FIGURE 1, but with the carcass deleted.

Proceeding therefore to describe my invention in detail, reference should be made to FIGURE 1 in which 10 illustrates the supporting framework of an endless conveyor type hide puller in which 11 is endless conveyor passing around guide pulleys 12, 13 and upper power pulley 14, the conveyor being driven from the source of power 15.

The front run 16 of the hide puller is provided with channel like guide means 17 which controls the directional characteristics of the front run as clearly described in the aforementioned United States patent, hooks 18 projecting between the guide channels 17 so that chains 19 may be attached to these hooks and also the hide 20 adjacent the front legs 21 of the animal.

Figures 5, 6:
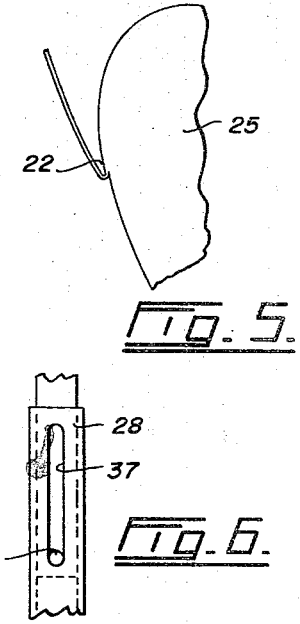
FIGURE 5 is a schematic view of the hide being stripped from a carcass showing the fold line which causes most of the displacement of dirt and debris from the hide.
FIGURE 6 is a fragmentary side elevation of a portion of the upper end of my device showing an alternative method of providing movement for the over-spanning member.
Figure 7:
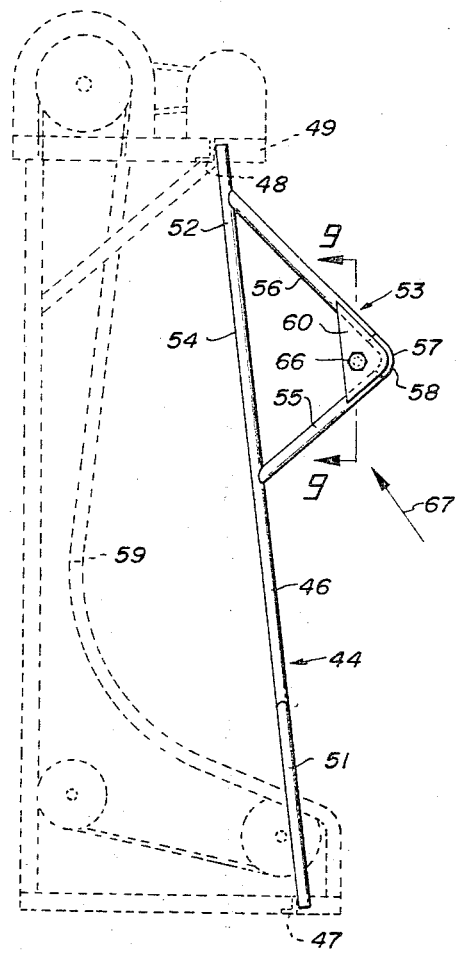
FIGURE 7 is a side elevation of a hide puller with the preferred embodiment of my device installed thereon.

As the front run of the conveyor moves upwardly, the hide is stripped from the carcass and as it is stripped from the carcass, a folded area 22 forms as shown in FIGURE 5. This flexing of the hide at the fold area, causes the displacement of dust, dirt and debris from the outer surface of the hide, which can readily fall upon the skinned carcass.

My device collectively designated 23 comprises a pair of spaced and parallel hide guide rails 24 situated vertically between the front run of the conveyor and the carcass 25 from which the hide is being stripped.

These hide guide rails 24 are relatively closely spaced together in spaced and parallel relationship one upon each side of the front run so that the chain 19 and the hide being stripped from the carcass, passes between these hide guide rails 24 and the hide is restricted in outward movement thereby.

Lead in portions 26 are provided on the guide rails 24 and upon the inner surfaces thereof to facilitate the entrance of the chains and the portion of the hide first being stripped and these lead in portions are situated adjacent the lower ends 27 of the guide rails where same are anchored to the base of the machine.

The lead in portions are formed preferably by narrowing the distance between the guide rails 24, said narrowed distance existing and being maintained between the guide rails for the remainder of the length thereof above the lead in portions 26.

It will also be noted that these lead in portions are curved or rounded where angulation occurs thus guiding the chains 19 and the hide into the major portion of the guide rail assembly.

Figures 3, 4:
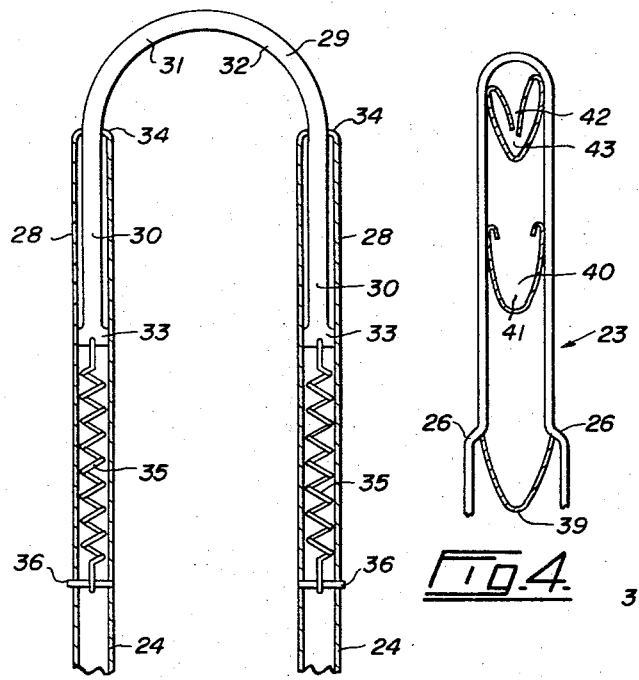
FIGURE 3 is a fragmentary partly sectioned view of the upper end of my device enlarged in scale with reference to FIGURES 1 and 2.
FIGURE 4 is a schematic front elevation of my device showing the action upon the hide being stripped, in three positions.

Upon the upper ends 28 of the hide guide rails 24 I provide an over-spanning member 29 which is preferably movable vertically within limits as illustrated in FIGURES 3 and 4.

The guide rails 24 are preferably tubular and the over-spanning portion 29 includes a pair of spaced and parallel legs 30 adapted to slide within the upper ends 28 of the guide rails 24. A curved portion 31 joins the two legs together 30 as shown in FIGURE 3, at least the inner surface 32 of this curved portion being concavedly curved.

FIGURE 3 shows one method of limiting the upward movement of the over-spanning member 29 including an enlargement 33 upon the lower end of each leg 30. The upper extremities 34 of the tubular members are velled inwardly as shown thus preventing the enlarged ends 33 from passing the extremities 34.

Tension springs 35 extend between the enlarged ends 33 and anchor pins 36 passing through the members 24, said tension springs normally maintaining the over-spanning portion in the lower-most position, but permitting limited upward movement thereof against the tension of the springs 35.

An alternative method of limiting the vertical movement of the over-spanning member is shown in FIGURE 6 in which the wall of the upper ends 28 of the guides 24 are vertically slotted as at 37 and a pin 38 passes through the lower ends of the legs 30 and into the guide slots 37, it being understood that springs 35 are secured to the lower ends of the legs as described in the previous embodiment.

FIGURE 4 shows schematically the approximately cross section representation of the hide at three positions.

Reference character 39 shows the hide just as it is passing between the guide bars adjacent the lead in portions 26.

As the hide is stripped from the carcass, the guides roll the hide to the approximate configuration indicated by the reference character 40 so that any debris is held within the area 41.

When the hook 18 carrying the chain 19 passes above the height of the over-spanning member 29, the angle of pull is changed slightly and the hide is rolled over upon itself as indicated by reference character 42 thus trapping debris within the area 43 preventing displacement thereof upon the stripped carcass.

The hide being relatively tightly rolled at this point, is stripped from the tail and taken over the top of the hide puller as described in the aforementioned United States patent.

Not only does the provision of the vertical guides trap dirt and debris and prevent the deposition thereof upon the stripped carcass, but also the angle of pull of the hide from the carcass is changed so that a peeling action is provided rather than a tearing action.

It will be appreciated that without the guide rails, the breadth of the carcass is such that the hide tends to extend in a straight line from the anchor points of the chains 19 to the point of connection to the carcass where it is being stripped from.

By forcing the hide to pass between the guide rails 24, the peeled portion of the hide makes a sharper angle with the carcass thus providing a peeling separation rather than a tearing action.

The vertical movement provided to the over-spanning portion 29 gives a limited adjustment so that the device can be used efficiently upon carcasses of varying sizes, the amount of movement being controlled primarily by the biasing action of springs 35 which normally maintain the over-spanning member in the lowermost position illustrated in FIGURE 3.

Also from the standpoint of hygiene and cleanliness, it is desirable to encase the sides of the hide puller with sheet metal side panels 44' extending from the guide bars 24 rearwardly to the supporting framework 10 of the hide puller.

By changing the angle of pull as aforesaid, I overcome difficulties normally occurring at the shoulder area. Due to the breadth and contour of these areas, the hide normally tends to pull tissue away from the flesh thus letting air enter the subcutaneous tissue. This is undesirable as contamination may occur and cutting is made difficult.

Also, it is normal, in pullers not utilizing the guides, to butt the hind leg areas towards the rump as these cannot be pulled by the puller. The hide thus separated, prior to pulling, must not be allowed to make contact with the flesh and it is difficult to prevent these flaps of hide from snapping back on the flesh, as the hide is pulled from the carcass, which action deposits dirt and manure onto the flesh. The use of the guides eliminates the necessity of this pre-butting operation.

With the device hereinbefore described, I have found, under certain circumstances, that there is a tendency for the tail of the carcass, after the hide has been stripped therefrom, to fall rearwardly and sometimes strike the hide puller thus becoming contaminated.

Also, when the hide is peeled from the hip area of the carcass, there is a tendency for the ends to slip thus spreading contamination from the surface of the hide, to the skinned carcass.

Also the skinning rail can be moved farther away from the hide puller in order to prevent the tail engaging same, nevertheless this has a tendency to interfere with an efficient hip or round pull.

Also with the previous embodiment, the hide guide rails, being of a constant width towards the upper end thereof, certain conditions arise in which the peeled hide is not maintained in the wrapped or closed condition necessary to contain the dust, dirt and manure often present thereon.

These disadvantages of the previous embodiment have been overcome by the provision of additional hide guide members substantially triangular when viewed in side elevation, which are secured to the original hide guide members adjacent the upper end thereof and extend outwardly away in a direction opposite to the hide puller.

The apices of these members incline together and are adjustable as to spacing so that the device can be adjusted to suit various conditions.

The upwardly and inwardly inclining lower portions of these additional hide guide members securely wrap the hide as it is passing therethrough and also accentuated the peeling action from the hide from the round or hip areas. Also with the provision of these additional hide guide rails, I can space the conveyor rail further from the hide puller thus preventing the stripped tail from engaging same.

Proceeding therefore to describe the construction of the additional embodiment, reference character 44 illustrates generally the hide guide assembly comprising a pair of spaced and parallel tubular members 46 extending from adjacent the lower support member 47 to an upper transverse support member 48 carried upon platform 49 which is part of the original hide puller.

Lead in areas 50 are provided adjacent the lower ends of the rails 46, by spacing the lower end portions 51 farther apart in a manner similar to that described in the previous embodiment.

Adjacent the upper end 52 of the guide is an additional guide means collectively designated 53.

In the present embodiment it consists of a length of pipe forming a substantial triangle with the upper portion 54 of the hide guide rails 46, when viewed in side elevation.

Each member comprises an upwardly and outwardly extending portion 55 and an upwardly and inwardly extending portion 56 being joined together by a curved union 57 at the apex 58 of the triangular formation. It will be appreciated and seen that these triangular formations extend outwardly from the hide guide rails 46 in a direction remote from the hide puller shown generally by the reference character 59.

Figure 8:
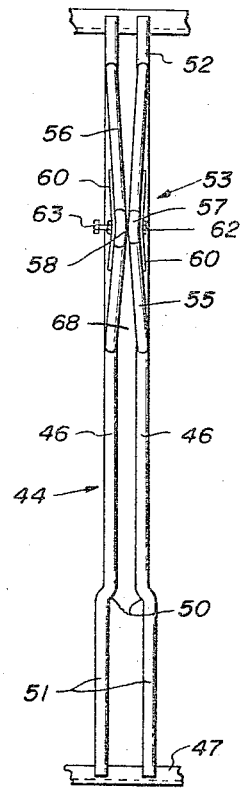
FIGURE 8 is a front elevation of FIGURE 7 but with the hide puller removed.
Figure 9:
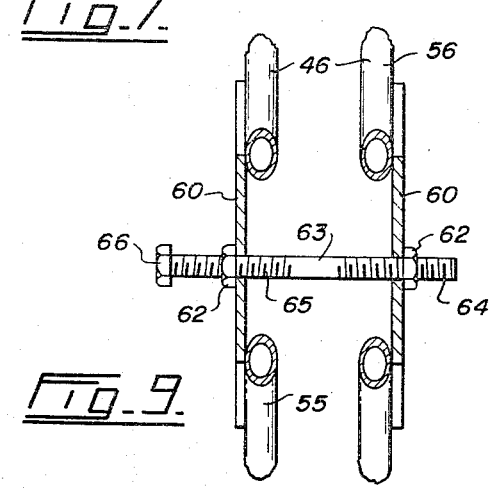
FIGURE 9 is an enlarged cross sectional view substantially along the line 9—9 of FIGURE 7.

Reference to FIGURE 8 will show that these additional hide guide means 53 also incline inwardly towards one another so that the apices 58 are adjacent one another substantially centrally between the guide rails 46.

It is desirable to provide limited adjustment of the distance between the apices 58 of the two additional hide guide means 53 and in this connection I have provided a gusset plate 60 secured as by welding to the upper and lower pipes 55 and 56 and adjacent the apices 58 thereof.

I weld left and right hand nuts one upon each plate 60, said nuts being identified by the reference character 62.

An adjustment bolt 63 is provided having oppositely threaded portions 64 and 65 formed thereon engageable through the nuts 62 and having a bolt head 66 upon one end thereof.

It will therefore be appreciated that rotation of the bolt 63 in either direction will move the apices 58 towards or apart from one another as desired.

The operation of the device is similar to that hereinbefore described, it benig observed that as the hide is being pulled from the hips or round, it is travelling substantially in the direction of arrow 67 and passes through the V-shaped aperture 68 between the lower portion 55 of the additional guide means 63 thus maintaining same in a tightly closed position and also ensuring that the peeling action is maintained over the hip portions of the carcass.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. In a hide puller for stripping hides from cattle and the like suspended from an overhead conveyor rail and having the front legs anchored, said hide puller including a substantially vertical endless conveyor, said conveyor including an upwardly moving front run, and conveyor front run guide means for controlling the directional characteristics of said front run, and means on said conveyor selectively connectable with the hide of said cattle adjacent front legs of said cattle; a pair of spaced, vertically situated hide guide rails one upon each side of said front run and situated between said front run and the cattle being stripped, whereby the hide being stripped from said cattle passes between said hide guide rails.

2. The device acording to claim 1 which includes an over-spanning member adjacent the upper ends of said vertical guide rails.

3. The device according to claim 2 in which said over-spanning member is movable vertically in said hide guide rails within limits.

4. The device according to claim 2 in which the underside of said over-spanning member is concavedly curved.

5. The device according to claim 3 in which the underside of said over-spanning member is concavedly curved.

6. The device according to claim 3 in which at least the upper portions of said hide guide rails are tubular, said over-spanning member including a pair of spaced parallel legs slidable in said tubular upper portions, and a curved portion spanning said legs, means co-operating between the lower ends of said legs and the upper ends of said guides to limit the upward movement of said legs in said guides, and a tension spring extending from said lower end of each of said legs and said guides normally biasing said over-spanning member downwardly within said tubular guides.

7. The device according to claim 1 which includes hide lead in portions on the inner surfaces of said hide guide rails, said lead in portions being formed by narrowing the distance between said hide guide rails adjacent the lower ends of said front run, said distance maintained between said guide rails for the remainder of the length thereof of said lead in portions.

8. The device according to claim 2 which includes hide lead in portions on the inner surfaces of said hide guide rails, said lead in portions being formed by narrowing the distance between said hide guide rails adjacent the lower ends of said front run, said distance maintained between said guide rails for the remainder of the length thereof of said lead in portions.

9. The device according to claim 3 which includes hide lead in portions on the inner surfaces of said hide guide rails, said lead in portions being formed by narrowing the distance between said hide guide rails adjacent the lower ends of said front run, said distance maintained between said guide rails for the remainder of the length thereof of said lead in portions.

10. The device according to claim 4 which includes hide lead in portions on the inner surfaces of said hide guide rails, said lead in portions being formed by narrowing the distance between said hide guide rails adjacent the lower ends of said front run, said distance maintained between said guide rails for the remainder of the length thereof of said lead in portions.

11. The device according to claim 5 which includes hide lead in portions on the inner surfaces of said hide guide rails, said lead in portions being formed by narrowing the distance between said hide guide rails adjacent the lower ends of said front run, said distance maintained between said guide rails for the remainder of the length thereof of said lead in portions.

12. The device according to claim 6 which includes hide lead in portions on the inner surfaces of said hide guide rails, said lead in portions being formed by narrowing the distance between said hide guide rails adjacent the lower ends of said front run, said distance maintained between said guide rails for the remainder of the length thereof of said lead in portions.

13. The device according to claim 1 which includes additional guide means secured adjacent the upper ends of said hide guide rails and extending outwardly therefrom upon the side of said rails remote from said conveyor front run.

14. The device according to claim 13 in which said additional guide means comprise a member secured to each of said hide guide rails, said members inclining towards one another at a point thereon farthest from said hide guide rails.

15. The device according to claim 14 which includes additional means cooperating between said additional guide means for adjusting, within limits, the distance between said points.

16. The device according to claim 13 in which said additional guide means comprises a member on each of said hide guide rails, each of said members being substantially triangular when viewed in side elevation, the apex of each of said members being spaced from said hide guide rails.

17. The device according to claim 16 in which the apices of said last mentioned members incline towards one another.

18. The device according to claim 17 which includes adjustment means cooperating between said last mentioned members to adjust, within limits, the distance between said apices.

19. The device according to claim 7 which includes additional guide means secured adjacent the upper ends of said hide guide rails and extending outwardly therefrom upon the side of said rails remote from said conveyor front run.

20. The device according to claim 19 in which said additional guide means comprise a member secured to each of said hide guide rails, said members inclining towards one another at a point thereon farthest from said hide guide rails.

21. The device according to claim 20 which includes additional means cooperating between said additional guide means for adjusting, within limits, the distance between said points.

22. The device according to claim 19 in which said additional guide means comprises a member on each of said hide guide rails, each of said members being substantially triangular when viewed in side elevation, the apex of each of said members being spaced from said hide guide rails.

23. The device according to claim 22 in which the apices of said last mentioned members incline towards one another.

24. The device according to claim 23 which includes adjustment means cooperating between said last mentioned members to adjust, within limits, the distance between said apices.

References Cited

UNITED STATES PATENTS

| | | | |
|---|---|---|---|
| 3,129,454 | 4/1964 | Johnson | 17—21 |
| 3,209,395 | 10/1965 | Jones et al. | 17—21 |
| 3,229,328 | 1/1966 | Schmidt | 17—21 |
| 3,235,905 | 2/1966 | Schmidt | 17—21 |

LUCIE H. LAUDENSLAGER, *Primary Examiner.*